(12) United States Patent
Chen et al.

(10) Patent No.: US 11,494,658 B2
(45) Date of Patent: Nov. 8, 2022

(54) SUMMARY GENERATION METHOD, SUMMARY GENERATION MODEL TRAINING METHOD, AND COMPUTER DEVICE

(71) Applicant: Tencent Technology (Shenzhen) Company Limited, Shenzhen (CN)

(72) Inventors: Xinpeng Chen, Shenzhen (CN); Lin Ma, Shenzhen (CN); Wenhao Jiang, Shenzhen (CN); Wei Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 515 days.

(21) Appl. No.: 16/685,702

(22) Filed: Nov. 15, 2019

(65) Prior Publication Data

US 2020/0082271 A1 Mar. 12, 2020

Related U.S. Application Data

(63) Continuation of application No. PCT/CN2018/111709, filed on Oct. 24, 2018.

(30) Foreign Application Priority Data

Nov. 30, 2017 (CN) .......................... 201711243949.4

(51) Int. Cl.
*G06N 3/08* (2006.01)
*G06N 3/04* (2006.01)
(52) U.S. Cl.
CPC ........... *G06N 3/084* (2013.01); *G06N 3/0445* (2013.01); *G06N 3/0454* (2013.01)
(58) Field of Classification Search
CPC .................... G06N 3/084; G06N 3/0445–0454
See application file for complete search history.

(56) References Cited

U.S. PATENT DOCUMENTS

2016/0232440 A1 8/2016 Gregor et al.
2016/0234174 A1* 8/2016 Zizi ...................... H04L 63/061
(Continued)

FOREIGN PATENT DOCUMENTS

CN 105868829 A 8/2016
CN 107038221 A 8/2017
(Continued)

OTHER PUBLICATIONS

PCT/CN2018/111709 English Translation of the Written Opinion of the International Search Authority dated May 30, 2020, retrieved from https://globaldossier.uspto.gov/#/details/CN/PCT%252FCN2018%252F111709/W/103903 (Year: 2020).*
(Continued)

*Primary Examiner* — Calvin Cheung
(74) *Attorney, Agent, or Firm* — Crowell & Moring LLP

(57) ABSTRACT

This application relates to an abstract description generating method, an abstract description generation model training method, a computer device, and a storage medium. The abstract description generating method includes: inputting a labeled training sample into an abstract description generation model; performing first-phase training on an encoding network and a decoding network of the abstract description generation model based on supervision of a first loss function; obtaining a backward-derived hidden state of a previous moment through backward derivation according to a hidden state of each moment outputted by the decoding network; obtaining a value of a second loss function according to the backward-derived hidden state of the previous moment and an actual hidden state of the previous moment outputted by the decoding network; and obtaining final model parameters of the abstract description generation model determined based on supervision of the second loss function to reach a preset threshold value.

17 Claims, 7 Drawing Sheets

(56) References Cited

U.S. PATENT DOCUMENTS

| | | | |
|---|---|---|---|
| 2016/0307094 A1 | 10/2016 | Davis et al. | |
| 2017/0148433 A1 | 5/2017 | Catanzaro et al. | |
| 2017/0200066 A1 | 7/2017 | Wang et al. | |
| 2017/0256254 A1* | 9/2017 | Huang | G06N 3/0445 |

FOREIGN PATENT DOCUMENTS

| | | |
|---|---|---|
| CN | 107066973 A | 8/2017 |
| CN | 108334889 A | 7/2018 |
| EP | 3054403 A2 | 10/2016 |
| EP | 3312777 A1 | 4/2018 |

OTHER PUBLICATIONS

Chinese International Search Report for corresponding PCT Application No. PCT/CN2018/111709 dated Jan. 30, 2019.

Office Action issued in European Application 18883654.8 dated Apr. 5, 2022, 8 pages.

* cited by examiner

SUMMARY GENERATION METHOD, SUMMARY GENERATION MODEL TRAINING METHOD, AND COMPUTER DEVICE

RELATED APPLICATION

This application is a continuation application of and claims priority to PCT International Application No. PCT/CN2018/111709 entitled "SUMMARY GENERATION METHOD AND APPARATUS, AND SUMMARY GENERATION MODEL TRAINING METHOD AND APPARATUS" and filed with the China National Intellectual Property Administration on Oct. 24, 2018, which claims priority to Chinese Patent Application No. 201711243949.4, entitled "SUMMARY GENERATION METHOD AND APPARATUS, AND SUMMARY GENERATION MODEL TRAINING METHOD AND APPARATUS" filed on Nov. 30, 2017, which are incorporated by reference in their entireties.

FIELD OF THE TECHNOLOGY

This application relates to the field of machine learning technologies, and in particular, to an abstract description or summary generation method, an abstract description generation model training method, a computer device, and a storage medium.

BACKGROUND OF THE DISCLOSURE

Abstract description means describing information with a statement representing an abstract (alternatively referred as "summary" in this disclosure) of the information. The information may be an image, a video, or a text. An abstract description model may include a neural network model configured to obtain an abstract of information according to the inputted information.

Generally, the abstract description model includes an encoding network and a decoding network. The encoding network is configured to extract features from inputted data (an image or a text) to obtain an eigenvector of the inputted data. The eigenvector is inputted to a decoding network to obtain a hidden state at each time moment, and words of a current time moment are predicted according to the hidden state, thus outputting a descriptive statement.

In a conventional abstract description model training process, the decoding network independently predicts the words of the current time moment according to the hidden state of the current time moment. However, context of a descriptive statement is generally correlated, and the correlation between two neighboring hidden states is not considered in a conventional abstract decoding network, resulting in low prediction accuracy of the abstract description model.

SUMMARY

This disclosure provide an abstract description generating method, an abstract description model training method, a computer device, and a storage medium.

An abstract description generating method is disclosed. The method being implemented by a computer device and including:
 obtaining input information; and
 inputting the input information into a pre-trained abstract description model, obtaining an eigenvector of the input information through an encoding network of the abstract description model, and decoding the eigenvector through a decoding network of the abstract description model to generate abstract description of the input information, the encoding network and the decoding network being pre-trained based on supervision of a first loss function, a backward-derived hidden state of a previous moment being obtained through backward derivation according to a hidden state of each moment outputted by the encoding network, and the abstract description model determined based on supervision of a second loss function being obtained according to the backward-derived hidden state of the previous moment and an actual hidden state of the previous moment outputted by the decoding network.

An abstract description model training method is further disclosed. The method may be implemented by a computer device and may include:
 inputting an labeled training sample into an abstract description model;
 performing first-phase training on an encoding network and a decoding network of the abstract description model based on supervision of a first loss function, the encoding network obtaining an eigenvector of the training sample, and the decoding network decoding the eigenvector by using a recurrent neural network (RNN) to obtain a hidden state of each current moment;
 obtaining a backward-derived hidden state of a previous moment through backward derivation according to the hidden state of each moment outputted by the decoding network;
 obtaining a value of a second loss function according to the backward-derived hidden state of the previous moment and an actual hidden state of the previous moment outputted by the decoding network; and obtaining a final parameter of the abstract description model determined based on supervision of the second loss function in a case that the value of the second loss function reaches a preset value.

A computer device is further disclosed. The computer device may include: a memory and a processor, the memory storing a computer program, and the computer program, when executed by the processor, causing the processor to perform the following operations:
 obtaining input information; and
 inputting the input information into a pre-trained abstract description model, obtaining an eigenvector of the input information through an encoding network of the abstract description model, and decoding the eigenvector through a decoding network of the abstract description model to generate abstract description of the input information, the encoding network and the decoding network being pre-trained based on supervision of a first loss function, a backward-derived hidden state of a previous moment being obtained through backward derivation according to a hidden state of each moment outputted by the encoding network, and the abstract description model determined based on supervision of a second loss function being obtained according to the backward-derived hidden state of the previous moment and an actual hidden state of the previous moment outputted by the decoding network.

Another computer device is further disclosed. The computer device may include: a memory and a processor, the memory storing a computer program, and the computer program, when executed by the processor, causing the processor to perform the following operations:
 inputting an labeled training sample into an abstract description model;
 training an encoding network and a decoding network of the abstract description model based on supervision of a first loss function, the encoding network obtaining an eigenvector of the training sample, and the decoding network decoding the eigenvector by using an RNN to obtain a hidden state of each current moment;

obtaining a backward-derived hidden state of a previous moment through backward derivation according to the hidden state of each moment outputted by the decoding network;

obtaining a value of a second loss function according to the backward-derived hidden state of the previous moment and an actual hidden state of the previous moment outputted by the decoding network; and obtaining a final parameter of the abstract description model determined based on supervision of the second loss function in a case that the value of the second loss function reaches a preset value.

A computer-readable storage medium is further disclosed. The computer-readable storage medium may store a computer program, and the computer program, when executed by a processor, causing the processor to perform the following operations:

obtaining input information; and inputting the input information into a pre-trained abstract description model, obtaining an eigenvector of the input information through an encoding network of the abstract description model, and decoding the eigenvector through a decoding network of the abstract description model to generate abstract description of the input information, the encoding network and the decoding network being pre-trained based on supervision of a first loss function, a backward-derived hidden state of a previous moment being obtained through backward derivation according to a hidden state of each moment outputted by the encoding network, and the abstract description model determined based on supervision of a second loss function being obtained according to the backward-derived hidden state of the previous moment and an actual hidden state of the previous moment outputted by the decoding network.

Another computer-readable storage medium is further disclosed. The computer-readable storage medium may store a computer program, and the computer program, when executed by a processor, causing the processor to perform the following operations:

inputting a labeled training sample into an abstract description model;

training an encoding network and a decoding network of the abstract description model based on supervision of a first loss function, the encoding network obtaining an eigenvector of the training sample, and the decoding network decoding the eigenvector by using an RNN to obtain a hidden state of each current moment;

obtaining a backward-derived hidden state of a previous moment through backward derivation according to the hidden state of each moment outputted by the decoding network;

obtaining a value of a second loss function according to the backward-derived hidden state of the previous moment and an actual hidden state of the previous moment outputted by the decoding network; and obtaining a final parameter of the abstract description model determined based on supervision of the second loss function in a case that the value of the second loss function reaches a preset value.

Details of one or more embodiments of this application are described in the accompanying drawings and descriptions below. Other features, objectives and advantages of this application are clear from the specification, the accompanying drawings, and the claims.

BRIEF DESCRIPTION OF THE DRAWINGS

To describe the technical solutions of the embodiments of this application or the related technology more clearly, the following briefly introduces the accompanying drawings for describing the embodiments or the related technology. The accompanying drawings illustrate show only exemplary embodiments of the present invention, and a person of ordinary skill in the art may derive other drawings from these accompanying drawings without creative efforts.

DESCRIPTION OF EMBODIMENTS

To make the foregoing and other objectives, technical solutions, and advantages of this application more comprehensible, the application is further described with reference to the accompanying drawings and embodiments below. The specific embodiments described herein are used only to exemplify and not to limit the scope of this application.

Figure 1:
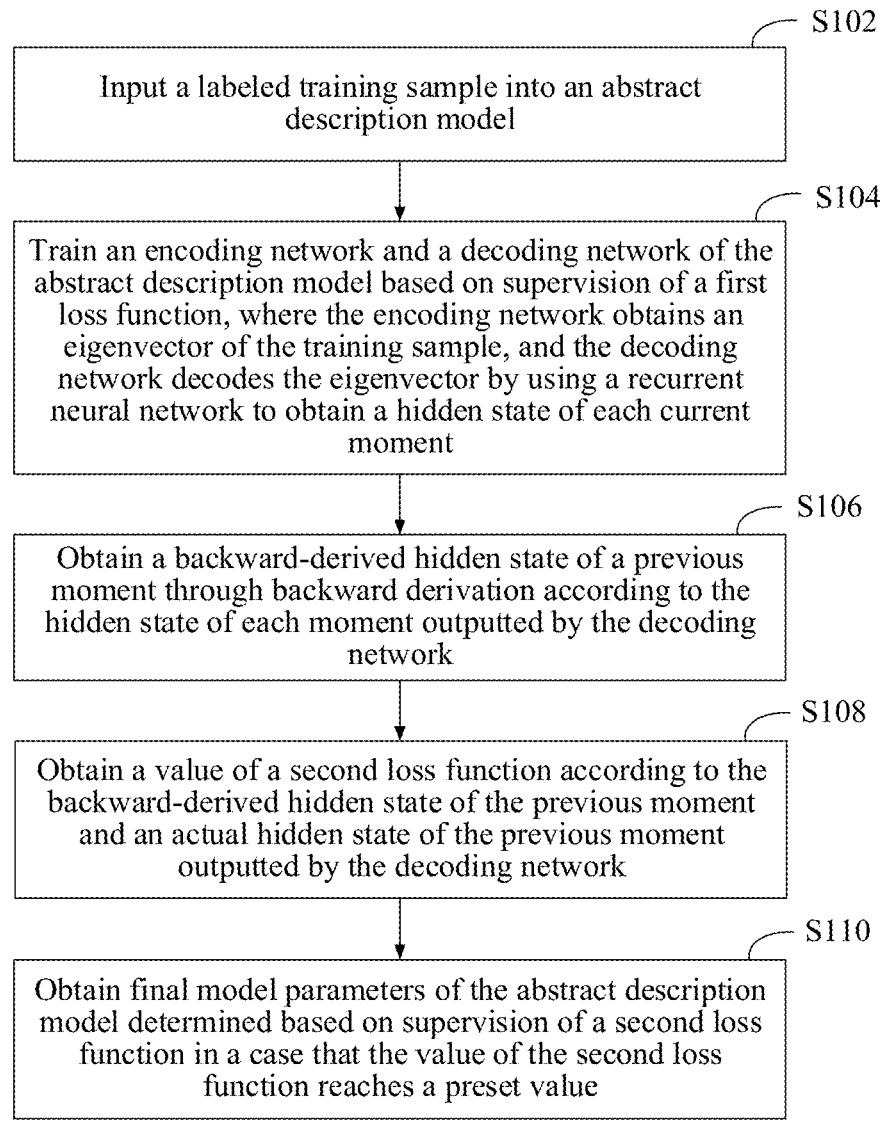
FIG. 1 is a schematic flowchart of an abstract description model training method in an embodiment.

As shown in FIG. 1, in an embodiment, an abstract description model training method is provided, and the method is implemented by a computer device. Referring to FIG. 1, the abstract description model training method specifically includes the following operations:

S102. Input a labeled training sample into an abstract description model.

The training sample may be an image, a text, or a video, depending on an actual application of the abstract description model. The labeled training sample includes the training sample and a descriptive statement for each training sample (a label). For example, for a given image or text segment I, the descriptive statement corresponding to the training sample is $y=\{y_1, y_2, \ldots, y_i\}$, $y_i$ being a word forming the descriptive statement.

The abstract description model is being trained in this embodiment. A training objective is to obtain relevant model parameters of the abstract description model. The abstract description model includes an encoding network and a decoding network. Features are extracted by using the encoding network, to obtain an eigenvector of input data. Then the eigenvector is decoded by using the decoding network. At each time moment in the decoding network, a hidden state of the current time moment is obtained. A word is generated from the hidden state at each time moment, and a descriptive statement is obtained after several decoding time moments.

S104. Train an encoding network and a decoding network of the abstract description mode based on supervision of a first loss function, when the encoding network obtains an eigenvector of the training sample, and the decoding network decodes the eigenvector by using a recurrent neural network (RNN) to obtain a hidden state of each current time moment (referred to as moment for simplicity).

The encoding network may obtain the eigenvector of the training sample, and the encoding network may use a convolutional neural network or the RNN. The eigenvector may include a global eigenvector and a local eigenvector, the global eigenvector being a global feature representation of the training sample, and the local eigenvector being a local feature representation of the training sample.

In this embodiment, training of the abstract description model includes two phases or stages. In the first phase, the encoding network and the decoding network of the abstract description model are used for training according to the labeled training sample. The encoding network obtains the eigenvector of the training sample, and the decoding network decodes the eigenvector to obtain a hidden state of each current moment. The decoding network generates a word according to the hidden state of each moment. A training objective of the first phase is to make the generated word corresponding to each moment as close as possible to an actual labeled word, and the word is used as the first loss function. This represents a training process of maximum likelihood estimation.

Preliminary model parameters of the abstract description model can be obtained after the first training phase is performed on the abstract description model based on the first loss function. Generally, a conventional abstract description model can be obtained according to the preliminary model parameter, and the conventional abstract description model can be configured to predict a text abstract of a text, an image or a video. However, the conventional abstract description model may not be optimal in that, in the training process, a word $y_{t+1}'$ of a current moment is independently predicted by using a hidden state $h_t$ of moment t, and similarly, a word $y_t'$ is independently predicted by using a hidden state $h_{t-1}$ of a previous moment t−1. However, in an actual prediction process, a word generated at each moment relies on a word (rather than hidden state) generated at a previous time moment. Such a difference between training and prediction also limits performance of a model. To this end, in this embodiment, relevance between neighboring hidden states of the decoding network is considered in the training process, and the abstract description model may be further trained in an additional stage.

Specifically, after step S104, the method further includes:

S106. Obtain a backward-derived hidden state of a previous moment through backward derivation according to the hidden state of each moment outputted by the decoding network.

The backward-derived hidden state of the previous moment refers to a backward-derived hidden state at a moment previous to a current moment obtained by means of backward derivation based on a hidden state of the current moment outputted by the decoding network. Specifically, the backward-derived hidden state of the previous moment is obtained by derivation. A decoding process of the decoding network is to compute a hidden state of a current moment according to a hidden state of a previous moment and input of the current moment. That is, there is a correlation between the hidden state of the previous moment and the hidden state of the current moment, and the hidden state of the previous moment can be derived from the hidden state of the current moment by using such a correlation.

S108. Obtain a value of a second loss function according to the backward-derived hidden state of the previous moment and an actual hidden state of the previous moment outputted by the decoding network.

In this embodiment, a root-mean-square error is used to measure a difference between the backward-derived hidden state $\hat{h}_{t-1}$ of the previous moment obtained through backward derivation and the actual hidden state $h_{t-1}$ of the previous moment outputted by the decoding network. The difference is used as the second loss function. An objective of the second loss function is to make the difference between the backward-derived hidden state of the previous moment and the actual hidden state of the previous moment as small as possible. A mean-square error is an expectation value of a second power of a difference between an estimate of a parameter and a true value of the parameter, and is denoted as MSE. The MSE is a convenient parameter for measuring an "average error", and can evaluate a degree of data variance. A smaller value of the MSE indicates higher accuracy of description of experimental data by a prediction model.

A smaller value of the second loss function indicates a smaller difference between the backward-derived hidden state of the previous moment and the actual hidden state of the previous moment. The backward-derived hidden state of the previous moment is obtained by means of backward derivation from the actual hidden state of the current moment outputted by the decoding network, and the correlation between two neighboring hidden states in the decoding network is considered. In an actual prediction process, the word generated at each moment relies on the word generated at the previous moment, and thus also relies on such a correlation. Therefore, by adding second-phase training in the training process of the abstract description model, the correlation between two neighboring hidden states in the decoding network is extracted to avoid the difference between training and prediction and further improve performance of the abstract description model.

S110. Obtain final model parameters of the abstract description model determined based on supervision of the second loss function in a case that the value of the second loss function reaches a preset minimum threshold value.

In this embodiment, a second-phase training process of the abstract description model is supervised based on the second loss function. The second-phase training process is a process of adjusting, according to the correlation between two neighboring hidden states in the decoding network, preliminary mode parameters of the abstract description model determined in the first phase to final model parameters of the abstract description model in a case that the value of the second loss function reaches the preset threshold value. Alternatively, in the second-phase training process, model parameters corresponding to a minimum value of the second loss function is used as the final model parameters of the abstract description model in a case that the number of training iterations is greater than a preset maximum number of training iterations.

Going beyond a conventional encoding network and decoding network, a process of obtaining the backward-derived hidden state of the previous moment through backward derivation according to the hidden state of each moment outputted by the decoding network and performing the second-phase training is added in the foregoing abstract description model training method. In the second-phase training, the value of the second loss function is obtained according to the backward-derived hidden state of the previous moment and the actual hidden state of the previous moment outputted by the decoding network, and the backward-derived hidden state of the previous moment is obtained through backward derivation by using the hidden state of the current moment outputted by the decoding network. A correlation between two neighboring hidden states in the decoding network is considered, and relied on in an actual prediction process. Therefore, the accuracy of actual prediction by the final abstract description model can be improved. In addition, the difference between data processing in the training and in the prediction can be avoided, thus further improving the performance of the abstract description model.

In an embodiment, the step of obtaining the backward-derived hidden state of the previous moment through backward derivation according to the hidden state of each moment outputted by the decoding network includes: obtaining the backward-derived hidden state of the previous moment through backward derivation by using the hidden state of each moment outputted by the decoding network as input of each corresponding moment of a reconfiguration network. The reconfiguration network is connected to the decoding network, and is configured to backward derive the hidden state of the previous moment corresponding to each moment such that output of the decoding network relies on the context that follows. In some implementations, the reconfiguration network may be based on a recurrent neural network (RNN).

Figure 2:
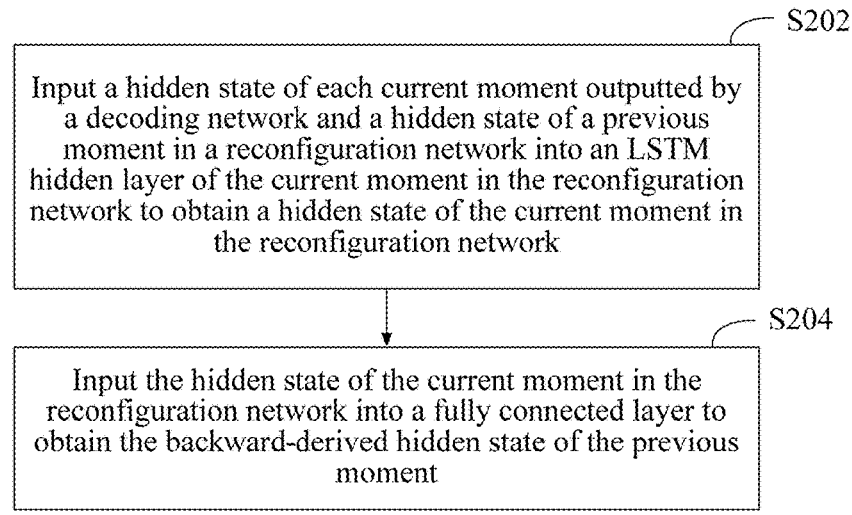
FIG. 2 is a logic and data flow for obtaining a backward-derived hidden state of a previous moment through backward derivation by using a reconfiguration network in an embodiment.

FIG. 2 is a flowchart for obtaining a backward-derived hidden state of a previous moment through backward derivation by using a reconfiguration network in an embodiment. As shown in FIG. 2, the flow includes:

S202. Input a hidden state of each current moment outputted by the decoding network and a hidden state of a previous moment in the reconfiguration network into a long short-term memory (LSTM) hidden layer of each current moment in the reconfiguration network to obtain a hidden state of the current moment in the reconfiguration network.

Figure 3:
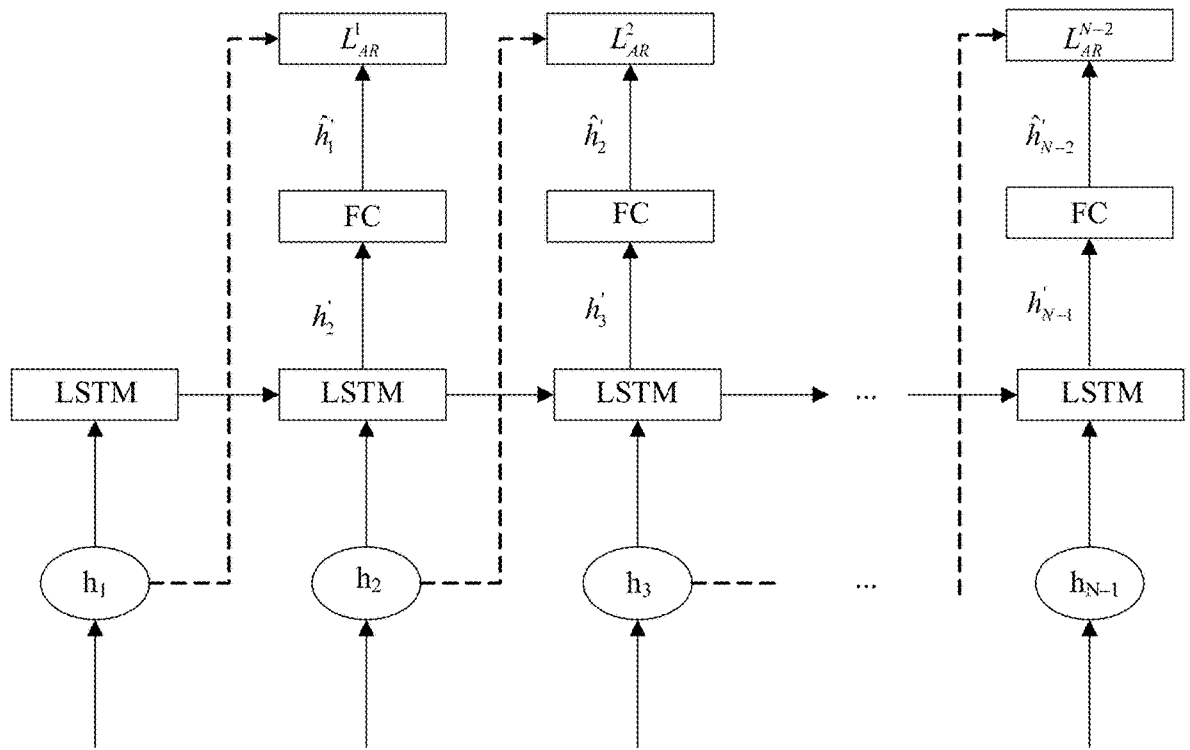
FIG. 3 is a schematic structural diagram of an example reconfiguration network in an embodiment.

FIG. 3 is a schematic structural diagram of a reconfiguration network implemented as a recurrent network with long-short term memories (LSTMs). The reconfiguration network includes an LSTM hidden layer and a fully connected layer FC. Output of a hidden state of each moment in the decoding network is connected to an LSTM hidden layer of a corresponding moment in the reconfiguration network, and each LSTM hidden layer is connected to one fully connected layer.

Specifically, a specific form of reconfiguration is as follows:

By using a hidden state $h_t$ of a current moment outputted by the decoding network and a hidden state $h_{t-1}'$ of a previous moment in the reconfiguration network, a hidden state $h_{t-1}$ of the previous moment is reconfigured through an LSTM hidden layer. A specific form is as follows:

$$\begin{pmatrix} i_t' \\ f_t' \\ o_t' \\ g_t' \end{pmatrix} = \begin{pmatrix} \sigma \\ \sigma \\ \sigma \\ \tanh \end{pmatrix} T \begin{pmatrix} h_t \\ h_{t-1}' \end{pmatrix}$$

$$c_t' = f_t' \odot c_{t-1}' + i_t' \odot g_t'$$

$$h_t' = o_t' \odot \tanh(c_t')$$

$i_t'$ is an input gate, $f_t'$ is a forget gate, $o_t'$ is an output gate, $g_t'$ is output of a current moment, $c_t'$ is input of the current moment, and $\sigma$ is a sigmoid function; T is a transform mapping matrix; tan h ( ) is an activation function; and $\odot$ is an element-by-element point multiplication operator.

Returning to FIG. 2, the flow for obtaining a backward-derived hidden state of a previous moment further includes S204: Input the hidden state of the current moment in the reconfiguration network into a fully connected layer to obtain a backward-derived hidden state of the previous moment.

In the foregoing formula, $h_t'$ is a hidden state of moment t in the reconfiguration network, and the hidden state $h_t'$ of the moment t in the reconfiguration network passes through a fully connected layer to obtain a backward-derived hidden state $\hat{h}_{t-1}$ of the previous moment.

In this embodiment, the reconfiguration network is not limited to using the LSTM hidden layer to connect two neighboring hidden states in the decoding network. The reconfiguration network may also use network structures such as a gate recurrent unit (GRU), a multilayer perceptron (MLP), a convolutional neural network (CNN), and the like to connect and process neighboring hidden states.

In another embodiment, the step of obtaining the backward-derived hidden state of the previous moment through backward derivation according to the hidden state of each moment outputted by the decoding network includes: obtaining, by using a back propagation algorithm, the backward-derived hidden state of the previous moment through backward derivation according to the hidden state of each moment outputted by the decoding network.

The back propagation algorithm, as the name implies, is to solve and adjust model parameters for the abstract description model from the output of a neural network to the input of the neural network. Specifically, a method for solving unconstrained problems, such as a gradient descent method, may be used to obtain a final parameter. The back propagation algorithm includes the following steps S1 to S4:

S1: Perform feedforward pass computing, and obtain activation values of $L_2$, $L_3$ . . . , and an output layer $L_{nl}$ by using a forward pass formula.

S2: Compute a residual for each output unit i of the $nl^{th}$ layer (output layer).

S3: Compute a residual of an $i^{th}$ node of an $l^{th}$ layer for each layer, where l=nl−1, nl−2, nl−2 . . . , and 2.

S4: Compute a final partial derivative value according to the residuals.

Figure 4:
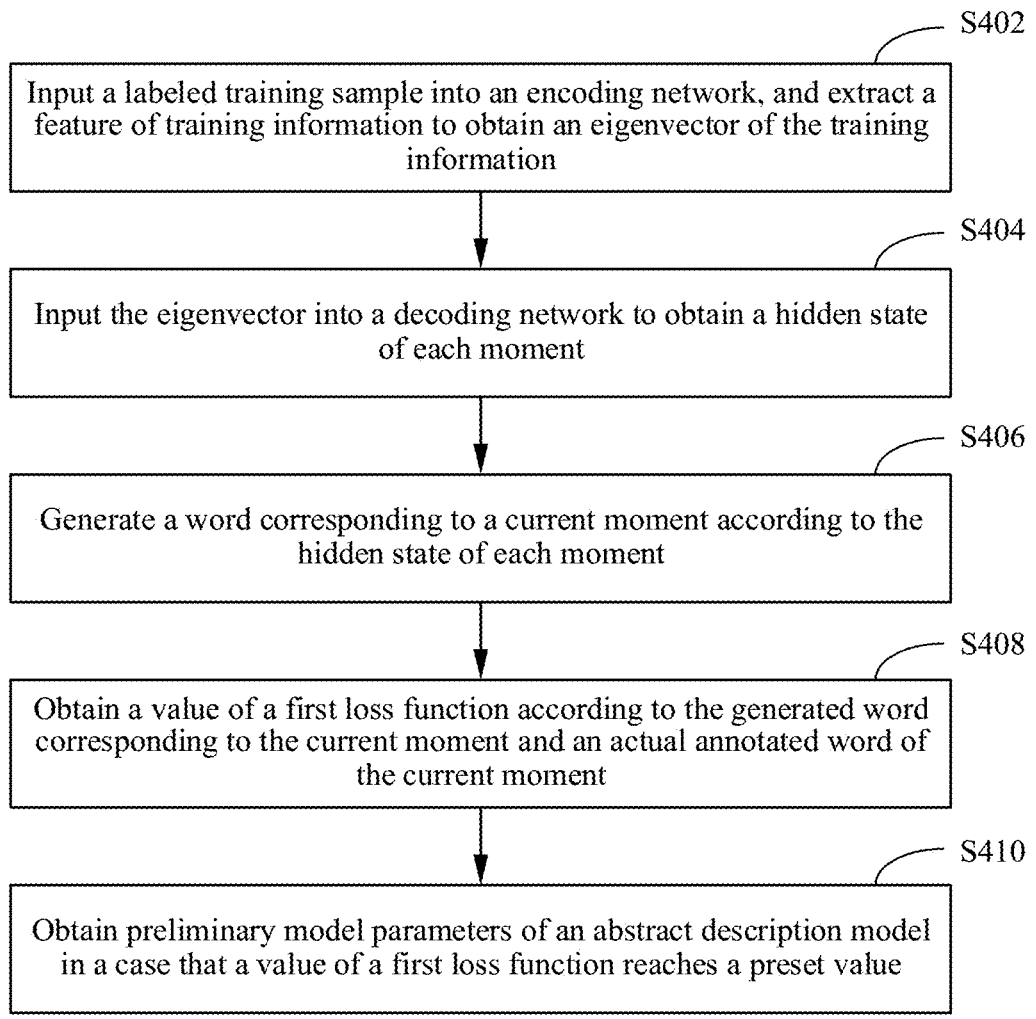
FIG. 4 is a logic and data flow for a first-phase training of an abstract description model in an embodiment.

FIG. 4 is a flowchart of steps of first-phase training of an abstract description model in an embodiment. As shown in FIG. 4, a first-phase training process includes the following operations:

S402. Input a labeled training sample into an encoding network, and extract features of training information to obtain an eigenvector of the training information.

Figure 5:
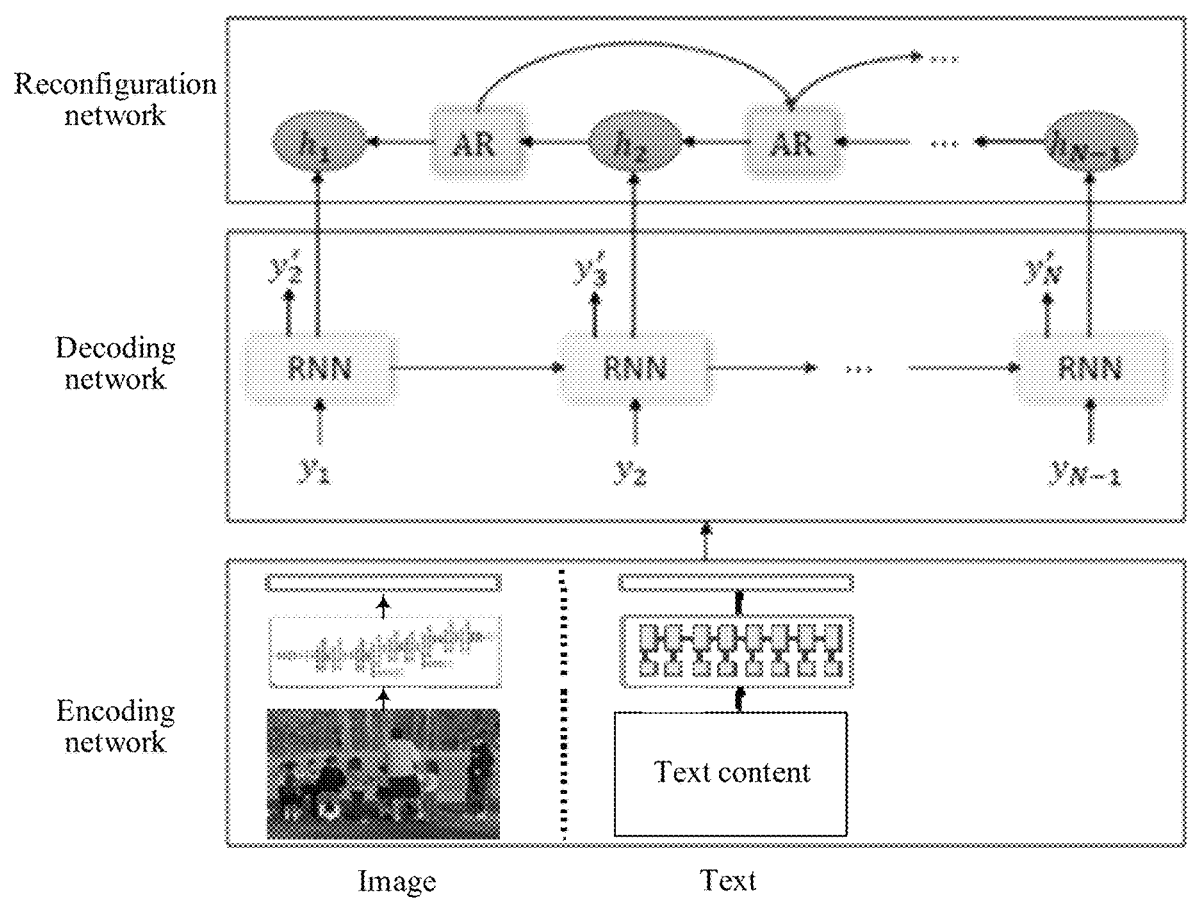
FIG. 5 is a schematic structural diagram of an abstract description model in an embodiment.

FIG. 5 is a schematic structural diagram of an abstract description model in an embodiment. As shown in FIG. 5, the description model includes an encoding network, a decoding network, and a reconfiguration network. Output of the encoding network is connected to input of the decoding network, and output of a hidden layers of each moment in the decoding network is connected to input of the corresponding moment in the reconfiguration network.

Specifically, a global feature of the training sample extracted by the encoding network is represented as g, and exemplary 64 local features are represented as S={$s_1$, . . . , $s_{64}$}. In this embodiment, based on characteristics of training samples, different encoding networks may be selected to extract the features.

Specifically, when an object to be described is an image, a convolutional neural network may be used as the encoding network. The convolutional neural network has good performance on a benchmark ImageNet data set. Currently, there are many types of convolutional neural networks that can be used as encoding networks, for example, convolutional neural networks of the Inception-X series, and convolutional neural networks of the ResNet series.

Specifically, a vector g outputted by a pooling layer of the convolutional neural network is taken as a global feature representation of the entire image, and g may, for example, include 1536 feature dimensions. Output s of the last Inception-C module of the convolutional neural network is then taken as a local feature representation of the image, and herein, for example, s={$s_1, \ldots, s_{64}$}. Each local eigenvector $s_i$, for example, may also include 1536 dimensions. Therefore, in this example, when an image is inputted into a convolutional neural network encoding network, a global eigenvector $g \in \mathbb{R}^{1536}$ of the image and a series of local eigenvectors of different regions of the image $s \in \mathbb{R}^{64 \times 1536}$ can be obtained.

When an object to be described is text data, because the text data has a sequencing characteristic, an RNN may be used to encode the text data. In this embodiment, a recurrent neural network with LSTM may be used for the text data.

A to-be-inputted text sequence may be denoted as I={$I_1, \ldots, I_T$}. Herein, $I_t$ is a $t^{th}$ word of a current sequence, and T is a length of the text sequence. In the LSTM, a hidden state $h_t$ may be obtained from a hidden state $h_{t-1}$ of a previous moment t−1 and input of a current moment t. A form is as follows:

$$h_t = \text{LSTM}(h_{t-1}, I_t)$$

In the encoding network, a specific example expression form of the LSTM is as follows:

$$\begin{pmatrix} i_t \\ f_t \\ o_t \\ g_t \end{pmatrix} = \begin{pmatrix} \sigma \\ \sigma \\ \sigma \\ \tanh \end{pmatrix} T \begin{pmatrix} I_t \\ h_{t-1} \end{pmatrix}$$

$$c_t = f_t \odot c_{t-1} + i_t \odot g_t$$

$$h_t = o_t \odot \tanh(c_t)$$

$i_t$ is an input gate, $f_t$ is a forget gate, $o_t$ is an output gate, $h_t$ is a hidden state, $g_t$ is output of a current moment, and $x_t$ is input of the current moment; $\sigma$ is a sigmoid function; T is a transform mapping matrix; and $\odot$ is an element-by-element point multiplication operator.

In this embodiment, a hidden state $h_T$ of moment T is taken as a global representation eigenvector g of a training text, to be specific, $g = h_T$. The hidden state $h_t$ generated at each moment in the LSTM is as a local representation feature of the training text, to be specific, s={$s_1, \ldots, s_T$}={$h_1, \ldots, h_T$}.

S404. Input the eigenvector into a decoding network, to obtain a hidden state of each moment.

Specifically, the decoding network includes a network structure for decoding, by using an RNN, the eigenvector outputted by the encoding network. The RNN may compute the hidden state $h_t$ of the current moment according to the hidden state $h_{t-1}$ of the previous moment and the input of the current moment. Specifically, an RNN with an attention mechanism may be used for decoding. A core unit of the RNN may be LSTM. An example decoding form of the decoding network is as follows:

$$\begin{pmatrix} i_t \\ f_t \\ o_t \\ g_t \end{pmatrix} = \begin{pmatrix} \sigma \\ \sigma \\ \sigma \\ \tanh \end{pmatrix} T \begin{pmatrix} x_t \\ h_{t-1} \\ z_t \end{pmatrix}$$

$$c_t = f_t \odot c_{t-1} + i_t \odot g_t$$

$$h_t = o_t \odot \tanh(c_t)$$

$i_t$ is an input gate, $f_t$ is a forget gate, $o_t$ is an output gate, $h_t$ is a hidden state of moment t, and $\sigma$ is a sigmoid function; T is a transform mapping matrix; tan h( ) is an activation function; and $\odot$ is an element-by-element point multiplication operator, $g_t$ is output of a current moment, and $x_t$ is input of the current moment. $z_t$ is a context vector obtained by the attention mechanism. A form is as follows:

$$z_t = f_{att}(s, h_{t-1}) = \sum_{i=1}^{|s|} \frac{\alpha(s_i, h_{t-1})}{\sum_{j=1}^{|s|} \alpha(s_j, h_{t-1})} s_i$$

In the foregoing formula, $\alpha(s_i, h_{t-1})$ represents relevance between a local feature s={$s_1, \ldots, s_T$} of input data and a previous hidden state.

S406. Generate a word corresponding to a current moment according to the hidden state of each moment.

A hidden state $h_t$ of the current moment is obtained by the decoding network at each moment, and a word $y_{t+1}'$ corresponding to the current moment is generated from the hidden state.

$$y_{t+1}' = \text{argmax Softmax}(W h_t)$$

W is a transformation matrix that maps a hidden vector to a glossary.

S408. Obtain a value of a first loss function according to the generated word corresponding to the current moment and an actual labeled word of the current moment.

The abstract description model includes the encoding network and the decoding network. The encoding network obtains an eigenvector of a training sample, and the decoding network decodes the eigenvector to obtain a hidden state of each moment. A word corresponding to a current moment is generated according to the hidden state of each moment, and a value of a first loss function is obtained according to the generated word corresponding to the current moment and a current actual labeled word.

In this embodiment, a root-mean-square error is used to measure a difference between a word corresponding to a current moment generated by the decoding network and a current actual labeled word, and the difference is used as the first loss function. An objective of the first loss function is to make the difference between the word corresponding to the current moment and the current actual labeled word as small as possible.

S410. Obtain preliminary model parameter of the abstract description model in a case that the value of the first loss function reaches a preset value.

In this embodiment, a first-phase training process of the abstract description model is supervised based on the first loss function. When the value of the first loss function reaches the preset value, corresponding parameters are taken as the preliminary model parameters of the abstract description model. Alternatively, in the first-phase training process, parameters corresponding to a minimum value of the first loss function is used as the preliminary model parameters of the abstract description model in a case that the number of iterations is greater than a preset maximum number of iterations.

An abstract description model of an embodiment is shown in FIG. 5. The description model includes an encoding network, a decoding network, and a reconfiguration network, output of the encoding network being connected to input of the decoding network, and output of a hidden layers of each moment of the decoding network being connected to input of the corresponding moment of the reconfiguration network.

Figure 6:
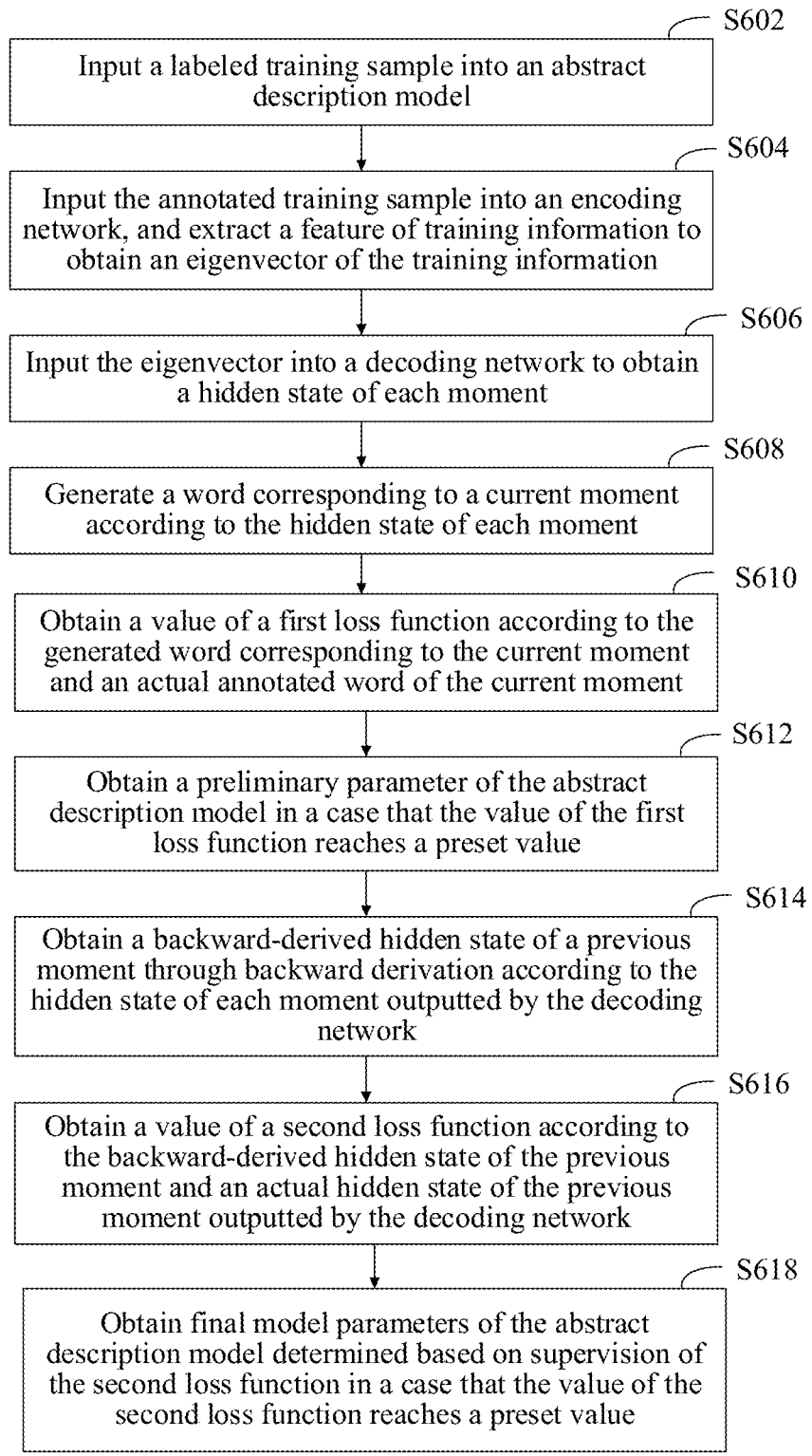
FIG. 6 is a logic and data flow for an abstract description model training method in another embodiment.

FIG. 6 is a flowchart of an abstract description model training method in an embodiment. As shown in FIG. 6, the method includes the following steps:

S602. Input a labeled training sample into an abstract description model.

S604. Input the labeled training sample into an encoding network, and extract features of training information to obtain an eigenvector of the training information.

S606. Input the eigenvector into a decoding network, and obtain a hidden state of each moment.

S608. Generate a word corresponding to a current moment according to the hidden state of each moment.

S610. Obtain a value of a first loss function according to the generated word corresponding to the current moment and an actual labeled word of the current moment.

S612. Obtain preliminary model parameters of the abstract description model in a case that the value of the first loss function reaches a preset value.

S614. Obtain a backward-derived hidden state of a previous moment through backward derivation according to the hidden state of each moment outputted by the decoding network.

Specifically, this step includes: obtaining the backward-derived hidden state of the previous moment through backward derivation by using the hidden state of each moment outputted by the decoding network as input of each corresponding moment of a reconfiguration network, or obtaining, by using a back propagation algorithm, the backward-derived hidden state of the previous moment through backward derivation according to the hidden state of each moment outputted by the decoding network.

S616. Obtain a value of a second loss function according to the backward-derived hidden state of the previous moment and the actual hidden state of the previous moment outputted by the decoding network.

S618. Obtain final model parameters of the abstract description model determined based on supervision of the second loss function in a case that the value of the second loss function reaches a preset value.

In this method, the correlation between the two neighboring hidden states in the decoding network is taken into consideration by training, and such a correlation is also relied on in an actual prediction process. Therefore, the accuracy of actual prediction can be improved. In addition, the difference between the training and the prediction can be avoided, thus further improving the performance of the abstract description model.

In an embodiment, an abstract description generating method is provided. The method is run on a server side and is implemented by a computer device on the server side. The method includes the following steps:

S1. Obtain input information.

The input information may be inputted by a user through a terminal device and transmitted to the server side. In this embodiment, the server may provide services such as retrieval and classification of the input information, and recommendation based on the input information and its classification. The input information may be a picture or text.

S2. Input the input information into a pre-trained abstract description model, obtain an eigenvector of the input information through an encoding network of the abstract description model, and decode the eigenvector through a decoding network of the abstract description model, to generate abstract description of the input information.

Specifically, the abstract description model is obtained through training by using the abstract description model training method in the foregoing embodiments. Specifically, the abstract description model training method is described in the foregoing embodiments and details are not described herein again. FIG. 5 shows an abstract description model of an embodiment. The abstract description generating method can be configured to perform prediction on text data, image data, or a video to generate a descriptive statement. Descriptions generated for images can be used for image classification, for example, automatic summarization and classification of images in a user album, and also facilitate an image retrieval service and help people with visual impairment understand the images. For text data, the technology may be configured to describe the meaning of the text and further provide classification and information mining.

Figure 7:
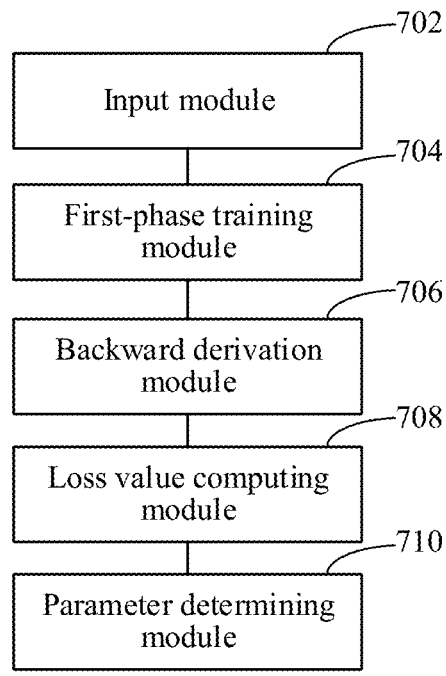
FIG. 7 is a structural block diagram of an abstract description model training apparatus in an embodiment.

FIG. 7 is a schematic structural diagram of an abstract description model training apparatus in an embodiment. As shown in FIG. 7, an abstract description model training apparatus includes an input module 702, a first-phase training module 704, a backward derivation module 706, a loss value computing module 708, and a parameter determining module 710.

The input module 702 is configured to input a labeled training sample into an abstract description model.

The first-phase training module 704 is configured to train an encoding network and a decoding network of the abstract description model based on supervision of a first loss function, the encoding network obtaining an eigenvector of the training sample, and the decoding network decoding the eigenvector by using an RNN to obtain a hidden state of each current moment.

The backward derivation module 706 is configured to obtain a backward-derived hidden state of a previous moment through backward derivation according to the hidden state of each moment outputted by the decoding network.

The loss value computing module 708 is configured to obtain a value of a second loss function according to the backward-derived hidden state of the previous moment and an actual hidden state of the previous moment outputted by the decoding network.

The parameter determining module 710 is configured to obtain final model parameters of the abstract description model determined based on supervision of the second loss function in a case that the value of the second loss function reaches a preset value.

Going beyond a conventional encoding network and decoding network, a process of obtaining the backward-derived hidden state of the previous moment through backward derivation according to the hidden state of each moment outputted by the decoding network and performing second-phase training is included in the foregoing abstract description model training apparatus. In the second-phase training, the value of the second loss function is obtained according to the backward-derived hidden state of the previous moment and the actual hidden state of the previous moment outputted by the decoding network, and the backward-derived hidden state of the previous moment is obtained through backward derivation by using the actual hidden state of the current moment outputted by the decoding network. A correlation between two neighboring hidden states in the decoding network is thus taken into considered during the training, and such a correlation is also relied on in an actual prediction process. Therefore, the accuracy of actual prediction can be improved. In addition, the difference between the training and the prediction can be avoided, thus further improving the performance of the abstract description model.

In another embodiment, the backward derivation module is configured to obtain the backward-derived hidden state of the previous moment through backward derivation by using the hidden state of each moment outputted by the decoding network as input of each corresponding moment in a reconfiguration network.

In still another embodiment, the backward derivation module includes a reconfiguration module and a connection module.

The reconfiguration module is configured to input the hidden state of each current moment outputted by the decoding network and a hidden state of the previous moment in the reconfiguration network into an LSTM hidden layer of the current moment of the reconfiguration network, to obtain a hidden state of the current moment in the reconfiguration network.

The connection module is configured to input the hidden state of the current moment in the reconfiguration network into a fully connected layer, to obtain the backward-derived hidden state of the previous moment.

In still another embodiment, the backward derivation module is configured to obtain, by using a back propagation algorithm, the backward-derived hidden state of the previous moment through backward derivation according to the hidden state of each moment outputted by the decoding network.

In an embodiment, the first-phase training module includes: an encoding module, a decoding module, a word generating module, a computing module, and a confirming module.

The encoding module is configured to input a labeled training sample into the encoding network, and extract a feature of training information to obtain an eigenvector of the training information.

The decoding module is configured to input the eigenvector into the decoding network to obtain the hidden state of each moment.

The word generating module is configured to generate a word corresponding to a current moment according to the hidden state of each moment.

The computing module is configured to obtain a value of the first loss function according to the generated word corresponding to the current moment and an actual labeled word of the current moment.

The confirming module is configured to determine whether the value of the first loss function reaches a preset value, and end the first-phase training in a case that a preset value is reached.

Figure 8:
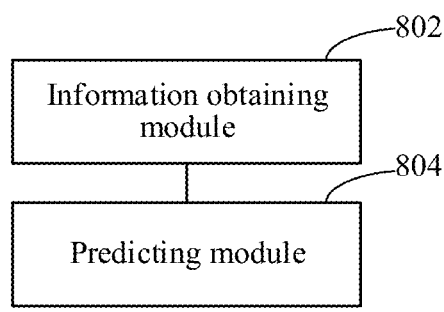
FIG. 8 is a structural block diagram of an abstract description apparatus in an embodiment.

In an embodiment, an abstract description generating apparatus is provided. As shown in FIG. 8, the abstract description generating apparatus includes an information obtaining module 802 and a prediction module 804.

The information obtaining module 802 is configured to obtain input information.

The prediction module 804 is configured to input the input information into a pre-trained abstract description model, obtain an eigenvector of the input information through an encoding network of the abstract description model, and decode the eigenvector through a decoding network of the abstract description model to generate abstract description of the input information, the encoding network and the decoding network being pre-trained based on supervision of a first loss function, a backward-derived hidden state of a previous moment being obtained through backward derivation according to a hidden state of each moment outputted by the encoding network, and the abstract description model determined based on supervision of a second loss function being obtained according to the backward-derived hidden state of the previous moment and an actual hidden state of the previous moment outputted by the decoding network.

Specifically, the abstract description generating apparatus further includes structures of modules of the abstract description module training apparatus in the foregoing embodiments, and details are not described herein again.

The abstract description generating apparatus can be configured to perform prediction on text data, image data, or a video to generate a descriptive statement. Descriptions generated for images may be used for image classification, for example, automatic summarization and classification of images in a user album, and also facilitate an image retrieval service and help people with visual impairment understand the images. For text data, the technology may be configured to describe the meaning of the text and further provide classification and in formation mining from the text.

Figure 9:
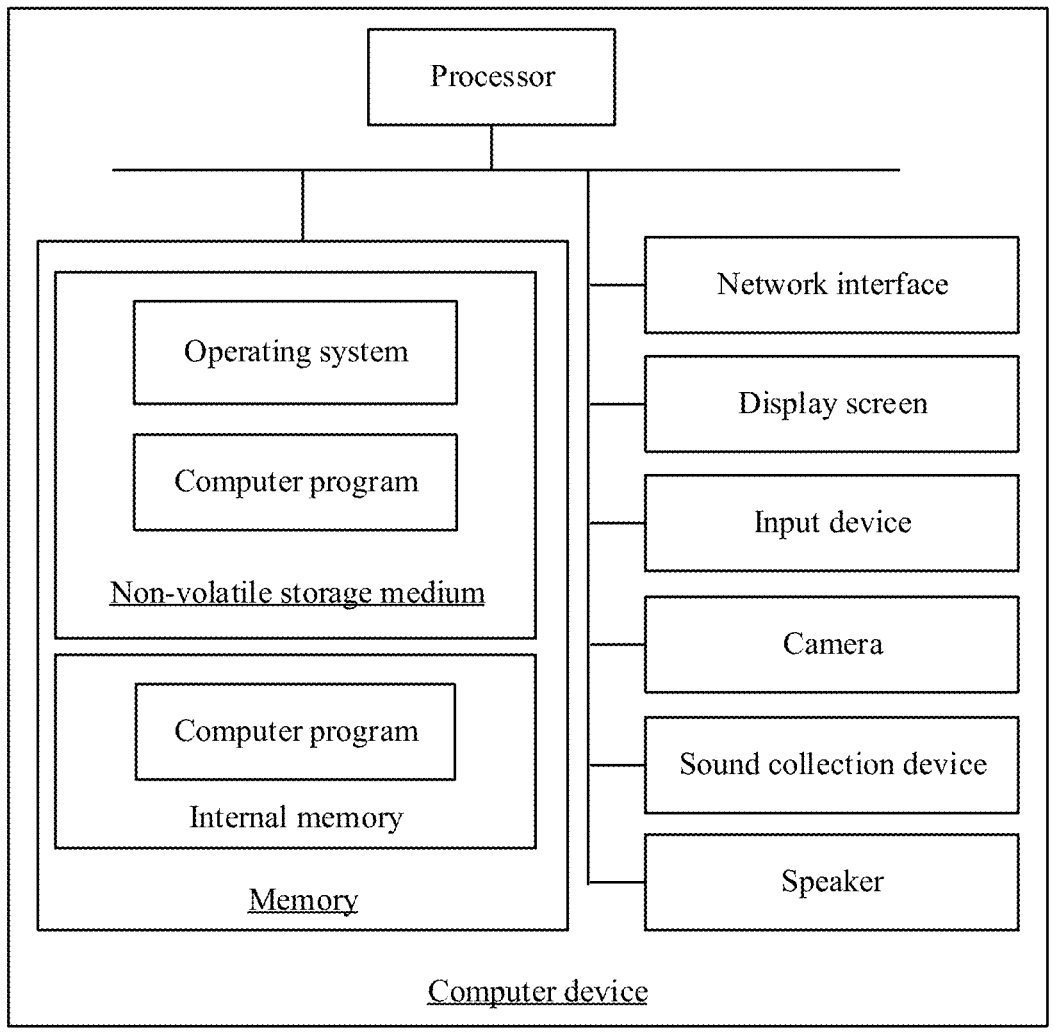
FIG. 9 is a structural block diagram of a computer device in an embodiment.

FIG. 9 is a diagram of an internal structure of a computer device in an embodiment. As shown in FIG. 9, the computer device includes a processor, a memory, a network interface, an input device, and a display screen that are connected through one or more system buses. The memory includes a non-volatile storage medium and an internal memory. The non-volatile storage medium of the computer device stores an operating system and may also store a computer program. When executed by the processor, the computer program causes the processor to implement an abstract description model training method or an abstract description generating method. The internal memory may also store a computer program, and when executed by the processor, the computer program causes the internal memory to perform the abstract description model training method or the abstract description generating method. The display screen of the computer device may be a liquid crystal display or an electronic ink display. The input device of the computer device may be a touch sensitive layer covering the display screen, or may be a key, a trackball or a touchpad disposed on a housing of the computer device, or may be an external keyboard, touchpad, or mouse, or the like.

A person having ordinary skill in the art understands that the structure shown in FIG. 9 is only a block diagram of partial structures related to the solution of this application and does not limit the computer device on which the solution of this application may be implemented. The specific computer device may include more components or fewer components than those shown in the figure, or some components may be combined, or a different component deployment may be used.

In an embodiment, the abstract description model training apparatus provided by this application may be implemented in a form of a computer program, and the computer program may be run on the computer device shown in FIG. 9. The memory of the computer device can store program modules that form the abstract description model training apparatus, for example, the input module, the first-phase training module, and the backward derivation module that are shown in FIG. 7, and the information obtaining module and the prediction module that are shown in FIG. 8. The computer program including the program modules causes the processor to perform the steps in abstract description model training in embodiments of this application.

For example, the computer device shown in FIG. 9 may perform, through the input module in the abstract description model training apparatus shown in FIG. 7, the step of inputting a labeled training sample into an abstract description model. The computer device may perform, through the first-phase training module, the step of performing first-phase training on an encoding network and a decoding network of the abstract description model based on supervision of a first loss function. The computer device may obtain, through the backward derivation module, a backward-derived hidden state of a previous moment through backward derivation according to a hidden state of each moment outputted by the decoding network.

For example again, the computer device in FIG. 9 may perform, through the input module in the abstract description generating apparatus shown in FIG. 8, the step of obtaining input information and perform, through the prediction module, the step of inputting the input information into a pre-trained abstract description model, obtaining an eigenvector of the input information through the encoding network of the abstract description model, and decoding the eigenvector through the decoding network of the abstract description model to generate abstract description of the input information.

In an embodiment, a computer device is provided. The computer device includes a memory and a processor. The memory stores a computer program. The computer program, when executed by the processor, causes the processor to perform the following operations:

obtaining input information; and inputting the input information into a pre-trained abstract description model, obtaining an eigenvector of the input information through an encoding network of the abstract description model, and decoding the eigenvector through a decoding network of the abstract description model to generate abstract description of the input information, the encoding network and the decoding network being pre-trained based on supervision of a first loss function, a backward-derived hidden state of a previous moment being obtained through backward derivation according to a hidden state of each moment outputted by the encoding network, and the abstract description model determined based on supervision of a second loss function being obtained according to the backward-derived hidden state of the previous moment and an actual hidden state of the previous moment outputted by the decoding network.

In an embodiment, when executed by the processor, the computer program causes the processor to perform the following operations:

inputting a labeled training sample into the abstract description model;

training the encoding network and the decoding network of the abstract description model based on supervision of the first loss function, the encoding network obtaining an eigenvector of the training sample, and the decoding network decoding the eigenvector by using an RNN to obtain a hidden state of each current moment;

obtaining a backward-derived hidden state of a previous moment through backward derivation according to the hidden state of each moment outputted by the decoding network;

obtaining a value of a second loss function according to the backward-derived hidden state of the previous moment and an actual hidden state of the previous moment outputted by the decoding network; and obtaining final model parameters of the abstract description model determined based on supervision of the second loss function in a case that the value of the second loss function reaches a preset value.

In an embodiment, the computer program, when executed by the processor, causes the processor to perform the following operation: obtaining the backward-derived hidden state of the previous moment by using the hidden state of each moment outputted by the decoding network as input of each corresponding moment of a reconfiguration network.

In an embodiment, the computer program, when executed by the processor, causes the processor to perform the following operations:

inputting the hidden state of each current moment outputted by the decoding network and a hidden state of the previous moment in the reconfiguration network into an LSTM hidden layer of the current moment of the reconfiguration network, to obtain a hidden state of the current moment in the reconfiguration network; and inputting the hidden state of the current moment in the reconfiguration network into a fully connected layer, to obtain the backward-derived hidden state of the previous moment.

In an embodiment, the computer program, when executed by the processor, causes the processor to perform the following operations: obtaining, by using a back propagation algorithm, the backward-derived hidden state of the previous moment through backward derivation according to the hidden state of each moment outputted by the decoding network.

In an embodiment, the computer program, when executed by the processor, causes the processor to perform the following operations:

inputting a labeled training sample into the encoding network, and extracting a feature of training information to obtain an eigenvector of the training information;

inputting the eigenvector into the decoding network to obtain a hidden state of each moment;

generating a word corresponding to a current moment according to the hidden state of each moment;

obtaining a value of the first loss function according to the generated word corresponding to the current moment and an actual labeled word of the current moment; and obtaining preliminary model parameters of the abstract description model in a case that the value of the first loss function reaches a preset value.

In an embodiment, a computer device is provided. The computer device includes a memory and a processor. The memory stores a computer program. The computer program, when executed by the processor, causes the processor to perform the following operations:

inputting a labeled training sample into an abstract description model;

training an encoding network and a decoding network of the abstract description model based on supervision of a first loss function, the encoding network obtaining an eigenvector of the training sample, and the decoding network decoding the eigenvector by using an RNN to obtain a hidden state of each current moment;

obtaining a backward-derived hidden state of a previous moment through backward derivation according to the hidden state of each moment outputted by the decoding network;

obtaining a value of a second loss function according to the backward-derived hidden state of the previous moment and an actual hidden state of the previous moment outputted by the decoding network;

obtaining final model parameters of the abstract description model determined based on supervision of the second loss function in a case that the value of the second loss function reaches a preset value.

In an embodiment, the computer program, when executed by the processor, causes the processor to perform the following operation: obtaining the backward-derived hidden state of the previous moment through backward derivation by using the hidden state of each moment outputted by the decoding network as input of each corresponding moment of a reconfiguration network.

In an embodiment, the computer program, when executed by the processor, causes the processor to perform the following operations:

inputting the hidden state of each current moment outputted by the decoding network and a hidden state of the previous moment in the reconfiguration network into an LSTM hidden layer of the current moment in the reconfiguration network, to obtain a hidden state of the current moment in the reconfiguration network; and inputting the hidden state of the current moment in the reconfiguration network into a fully connected layer, to obtain the backward-derived hidden state of the previous moment.

In an embodiment, the computer program, when executed by the processor, causes the processor to perform the following operation: obtaining, by using a back propagation algorithm, the backward-derived hidden state of the previous moment through backward derivation according to the hidden state of each moment outputted by the decoding network.

In an embodiment, the computer program, when executed by the processor, causes the processor to perform the following operations:

inputting a labeled training sample into the encoding network, and extracting a feature of training information to obtain an eigenvector of the training information;

inputting the eigenvector into the decoding network to obtain a hidden state of each moment;

generating a word corresponding to a current moment according to the hidden state of each moment;

obtaining a value of the first loss function according to the generated word corresponding to the current moment and an actual labeled word of the current moment; and obtaining preliminary model parameters of the abstract description model in a case that the value of the first loss function reaches a preset value.

In an embodiment, a computer-readable storage medium is provided. The computer-readable storage medium stores a computer program. The computer program, when executed by a processor, causes the processor to perform the following operations:

obtaining input information; and inputting the input information into a pre-trained abstract description model, obtaining an eigenvector of the input information through an encoding network of the abstract description model, and decoding the eigenvector through a decoding network of the abstract description model to generate abstract description of the input information, the encoding network and the decoding network being pre-trained based on supervision of a first loss function, a backward-derived hidden state of a previous moment being obtained through backward derivation according to a hidden state of each moment outputted by the encoding network, and the abstract description model determined based on supervision of a second loss function being obtained according to the backward-derived hidden state of the previous moment and an actual hidden state of the previous moment outputted by the decoding network.

In an embodiment, the computer program, when executed by the processor, causes the processor to perform the following operations:

inputting a labeled training sample into the abstract description model;

training the encoding network and the decoding network of the abstract description model based on supervision of the first loss function, the encoding network obtaining an eigenvector of the training sample, and the decoding network decoding the eigenvector by using an RNN to obtain a hidden state of each current moment;

obtaining a backward-derived hidden state of a previous moment through backward derivation according to the hidden state of each moment outputted by the decoding network;

obtaining a value of the second loss function according to the backward-derived hidden state of the previous moment and an actual hidden state of the previous moment outputted by the decoding network;

obtaining final model parameters of the abstract description model determined based on supervision of the second loss function in a case that the value of the second loss function reaches a preset value.

In an embodiment, the computer program, when executed by the processor, causes the processor to perform the following operation: obtaining the backward-derived hidden state of the previous moment through backward derivation by using the hidden state of each moment outputted by the decoding network as input of each corresponding moment of a reconfiguration or recurrent network.

In an embodiment, the computer program, when executed by the processor, causes the processor to perform the following operations:

inputting the hidden state of each current moment outputted by the decoding network and a hidden state of the previous moment in the reconfiguration network into an LSTM hidden layer of the current moment of the reconfiguration network, to obtain a hidden state of the current moment in the reconfiguration network; and inputting the hidden state of the current moment in the reconfiguration network into a fully connected layer, to obtain the backward-derived hidden state of the previous moment.

In an embodiment, the computer program, when executed by the processor, causes the processor to perform the following operation: obtaining, by using a back propagation algorithm, the backward-derived hidden state of the previous moment through backward derivation according to the hidden state of each moment outputted by the decoding network.

In an embodiment, the computer program, when executed by the processor, causes the processor to perform the following operations:

inputting a labeled training sample into the encoding network, and extracting a feature of training information to obtain an eigenvector of the training information;

inputting the eigenvector into the decoding network to obtain a hidden state of each moment;

generating a word corresponding to a current moment according to the hidden state of each moment;

obtaining a value of the first loss function according to the generated word corresponding to the current moment and an actual labeled word of the current moment; and obtaining preliminary model parameters of the abstract description model in a case that the value of the first loss function reaches a preset value.

In an embodiment, a computer-readable storage medium is provided. The computer-readable storage medium stores a computer program. The computer program, when executed by a processor, causes the processor to perform the following operations:

inputting a labeled training sample into an abstract description model;

training an encoding network and a decoding network of the abstract description model based on supervision of a first loss function, the encoding network obtaining an eigenvector of the training sample, and the decoding network decoding the eigenvector by using an RNN to obtain a hidden state of each current moment;

obtaining a backward-derived hidden state of a previous moment through backward derivation according to the hidden state of each moment outputted by the decoding network;

obtaining a value of a second loss function according to the backward-derived hidden state of the previous moment and an actual hidden state of the previous moment outputted by the decoding network; and obtaining final model parameters of the abstract description model determined based on supervision of the second loss function in a case that the value of the second loss function reaches a preset value.

In an embodiment, the computer program, when executed by the processor, causes the processor to perform the following operation: obtaining the backward-derived hidden state of the previous moment through backward derivation by using the hidden state of each moment outputted by the decoding network as input of each corresponding moment of a reconfiguration network.

In an embodiment, the computer program, when executed by the processor, causes the processor to perform the following operations:

inputting the hidden state of each current moment outputted by the decoding network and a hidden state of the previous moment in the reconfiguration network into an LSTM hidden layer of the current moment of the reconfiguration network, to obtain a hidden state of the current moment in the reconfiguration network; and inputting the hidden state of the current moment in the reconfiguration network into a fully connected layer, to obtain the backward-derived hidden state of the previous moment.

In an embodiment, the computer program, when executed by the processor, causes the processor to perform the following operation: obtaining, by using a back propagation algorithm, the backward-derived hidden state of the previous moment through backward derivation according to the hidden state of each moment outputted by the decoding network.

In an embodiment, the computer program, when executed by the processor, causes the processor to perform the following operations:

inputting a labeled training sample into the encoding network, and extracting a feature of training information to obtain an eigenvector of the training information;

inputting the eigenvector into the decoding network to obtain a hidden state of each moment;

generating a word corresponding to a current moment according to the hidden state of each moment;

obtaining a value of the first loss function according to the generated word corresponding to the current moment and an actual labeled word of the current moment; and obtaining preliminary model parameters of the abstract description model in a case that the value of the first loss function reaches a preset value.

A person of ordinary skill in the art understands that all or some of the processes in the foregoing embodiments may be implemented by a computer program running on relevant hardware. The computer program may be stored in a non-volatile computer-readable storage medium. When the program is executed, the processes of the embodiments of the foregoing methods may be performed. Any reference to the processor, storage, database, or another medium that is used in the embodiments provided by this application may include a non-volatile and/or volatile memory. The non-volatile memory may include a read-only memory (ROM), a programmable ROM (PROM), an electrically programmable ROM (EPROM), an electrically erasable programmable ROM (EEPROM), or flash memory. The non-volatile memory may include a random access memory (RAM) or an external cache. By way of description and not limitation, the RAM is available in a plurality of forms, for example, a static RANI (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a Rambus direct RAM (RDRAM), a direct Rambus dynamic RAM (DRDRAM), a Rambus dynamic RAM (RDRAM), and the like.

Technical features of the foregoing embodiments may be combined in any manner. For brevity of description, not all possible combinations of the technical features in the foregoing embodiments are described. However, as long as there is no contradiction in the combinations of these technical features, other combinations shall be considered as falling within the scope recorded in this specification.

The foregoing embodiments only describe several implementations of this application, and the description thereof is specific and detailed, but cannot therefore be understood as a limitation to the patent scope of this application. A person of ordinary skill in the art may further make variations and improvements without departing from the underlying principles of this application, and these variations and improvements all fall within the protection scope of this application.

What is claimed is:

1. An abstract description generating method, the method being implemented by a computer device and comprising:

obtaining an input data item;

inputting the input data item into a pre-trained abstract description generation model;

obtaining an eigenvector of the input data item through an encoding network of the pre-trained abstract description generation model;

decoding the eigenvector through a decoding network of the pre-trained abstract description generation model to generate a time sequence of hidden states; and generating an abstract description of the input data item from the time sequence of hidden states, wherein:

the encoding network and the decoding network are preliminarily-trained during a first training stage based on supervision of a first loss function representing an abstract description labeling loss to obtain preliminary model parameters for the encoding network and the decoding network; and the preliminarily-trained encoding network and the decoding network are further trained during a second training stage by obtaining a backward-derived hidden state of a previous time moment through backward derivation according to a hidden state of a current moment in a training time sequence of hidden state outputted by the encoding network; and further training the abstract description generation model including the preliminarily-trained encoding network and the decoding network based on supervision of a second loss function representing a difference between the backward-derived hidden state of the previous time moment and actual hidden state of the previous time moment outputted by the decoding network.

2. The method according to claim 1, further comprising:

inputting a labeled training sample into the pre-trained abstract description generation model prior to it being trained;

preliminarily training the encoding network and the decoding network of the abstract description generation model based on a supervision of the first loss function, wherein the encoding network generates an eigenvector of the training sample, and the decoding network decodes the eigenvector using a recurrent neural network (RNN) to obtain a time sequence of hidden states for the training sample;

obtaining backward-derived hidden states of a previous time moment each through backward derivation from each of the hidden state in the time sequence of hidden states for the training sample outputted by the decoding network during the preliminary training;

obtaining a value of the second loss function according to difference between the backward-derived hidden states and actual hidden states outputted by the decoding network at same time moments; and obtaining final model parameters of the abstract description generation model including the encoding network and the decoding network determined based on a supervision of the second loss function to reach a preset threshold value.

3. The method according to claim 2, wherein obtaining backward-derived hidden states through backward derivation comprises: back deriving each of the backward-derived hidden states using a reconfiguration network by processing the hidden states at each time moment outputted by the decoding network as input to the reconfiguration network at a corresponding time moment.

4. The method according to claim 3, wherein obtaining one of the backward-derived hidden states comprises:

inputting a hidden state at current time moment outputted by the decoding network and a hidden state of a previous time moment of the current time moment in the reconfiguration network into a long short-term memory (LSTM) hidden layer at the current time moment in the reconfiguration network, to obtain a hidden state at the current time moment in the reconfiguration network; and inputting the hidden state of the current time moment in the reconfiguration network into a fully connected layer, to obtain the backward-derived hidden state of the previous time moment.

5. The method according to claim 2, wherein obtaining backward-derived hidden states through backward derivation comprises: obtaining, by using a back propagation algorithm, each of the backward-derived hidden states of the previous time moment through backward derivation from each of the hidden state in the time sequence of the hidden states outputted by the preliminarily-trained decoding network.

6. The method according to claim 2, wherein preliminarily training the encoding network and the decoding network of the pre-trained abstract description generation model based on the supervision of the first loss function comprises:

inputting the labeled training sample into the encoding network, and extracting a feature of the training sample, to obtain an eigenvector of the training sample;

inputting the eigenvector into the decoding network to obtain the time sequence of hidden states for the training sample;

for each time moment in the time sequence of hidden states, generating a word according to corresponding hidden state in the sequence of hidden states;

obtaining a value of the first loss function according to the generated word and an actual label word corresponding to each time moment; and obtaining preliminary model parameters of the abstract description generation model by minimizing the first loss function to below a predetermined threshold value.

7. An abstract description generation model training method, the method being implemented by a computer device and comprising:

inputting a labeled training sample into the abstract description generation model;

preliminarily training an encoding network and a decoding network of the abstract description generation model based on a supervision of a first loss function, wherein the encoding network generates an eigenvector of the training sample, and the decoding network decodes the eigenvector using a recurrent neural network (RNN) to obtain a time sequence of hidden states for the training sample;

obtaining backward-derived hidden states of a previous time moment each through backward derivation from each of the hidden state in the time sequence of hidden states for the training sample outputted by the decoding network during the preliminary training;

obtaining a value of a second loss function according to difference between the backward-derived hidden states and actual hidden states outputted by the decoding network at same time moments; and obtaining final model parameters of the abstract description generation model including the encoding network and the decoding network determined based on a supervision of the second loss function to reach a preset threshold value.

8. The method according to claim 7, wherein obtaining backward-derived hidden states through backward derivation comprises: back deriving each of the backward-derived hidden states using a reconfiguration network by processing the hidden states at each time moment outputted by the decoding network as input to the reconfiguration network at a corresponding time moment.

9. The method according to claim 8, wherein obtaining one of the backward-derived hidden states comprises:
inputting a hidden state at current time moment outputted by the decoding network and a hidden state of a previous time moment of the current time moment in the reconfiguration network into a long short-term memory (LSTM) hidden layer at the current time moment in the reconfiguration network, to obtain a hidden state at the current time moment in the reconfiguration network; and
inputting the hidden state of the current time moment in the reconfiguration network into a fully connected layer, to obtain the backward-derived hidden state of the previous time moment.

10. The method according to claim 7, wherein obtaining backward-derived hidden states through backward derivation comprises: obtaining, by using a back propagation algorithm, each of the backward-derived hidden states of the previous time moment through backward derivation from each of the hidden state in the time sequence of the hidden states outputted by the preliminarily-trained decoding network.

11. The method according to claim 7, wherein preliminarily training the encoding network and the decoding network of the abstract description generation model based on the supervision of the first loss function comprises:
inputting the labeled training sample into the encoding network, and extracting a feature of the training sample, to obtain an eigenvector of the training sample;
inputting the eigenvector into the decoding network to obtain the time sequence of hidden states for the training sample;
for each time moment in the time sequence of hidden states, generating a word according to corresponding hidden state in the sequence of hidden states;
obtaining a value of the first loss function according to the generated word and an actual label word corresponding to each time moment; and
obtaining preliminary model parameters of the abstract description generation model by minimizing the first loss function to below a predetermined threshold value.

12. A computer device, comprising a memory and a processor, the memory storing a computer program, and the computer program, when executed by the processor, causing the processor to perform the following operations:
obtaining an input data item;
inputting the input data item into a pre-trained abstract description generation model, obtaining an eigenvector of the input data item through an encoding network of the pre-trained abstract description generation model;
decoding the eigenvector through a decoding network of the pre-trained abstract description generation model to generate a time sequence of hidden states; and
generating an abstract description of the input data item from the time sequence of hidden states,
wherein:
the encoding network and the decoding network are preliminarily-trained during a first training stage based on supervision of a first loss function representing an abstract description labeling loss to obtain preliminary model parameters for the encoding network and the decoding network; and
the preliminarily-trained encoding network and the decoding network are further trained during a second training stage by obtaining a backward-derived hidden state of a previous time moment through backward derivation according to a hidden state of a current moment in a training time sequence of hidden state outputted by the encoding network; and
further training the abstract description generation model including the preliminarily-trained encoding network and the decoding network based on supervision of a second loss function representing a difference between the backward-derived hidden state of the previous time moment and actual hidden state of the previous time moment outputted by the decoding network.

13. A computer device, comprising: a memory and a processor, the memory storing a computer program, and the computer program, when executed by the processor, causing the processor to perform the following operations:
inputting a labeled training sample into an abstract description generation model;
preliminarily training an encoding network and a decoding network of the abstract description generation model based on a supervision of a first loss function, wherein the encoding network generates an eigenvector of the training sample, and the decoding network decodes the eigenvector using a recurrent neural network (RNN) to obtain a time sequence of hidden states for the training sample;
obtaining backward-derived hidden states of a previous time moment each through backward derivation from each of the hidden state in the time sequence of hidden states for the training sample outputted by the decoding network during the preliminary training;
obtaining a value of a second loss function according to difference between the backward-derived hidden states and actual hidden states outputted by the decoding network at same time moments; and
obtaining final model parameters of the abstract description generation model including the encoding network and the decoding network determined based on a supervision of the second loss function to reach a preset threshold value.

14. The computer device according to claim 13, wherein the computer program, when executed by the processor, causes the processor to perform the following operation: back deriving each of the backward-derived hidden states using a reconfiguration network by processing the hidden states at each time moment outputted by the decoding network as input to the reconfiguration network at a corresponding time moment.

15. The computer device according to claim 14, wherein the computer program, when executed by the processor, causes the processor to perform the following operations:
inputting a hidden state at current time moment outputted by the decoding network and a hidden state of a previous time moment of the current time moment in the reconfiguration network into a long short-term memory (LSTM) hidden layer at the current time moment in the reconfiguration network, to obtain a hidden state at the current time moment in the reconfiguration network; and
inputting the hidden state of the current time moment in the reconfiguration network into a fully connected layer, to obtain the backward-derived hidden state of the previous time moment.

16. The computer device according to claim 13, wherein the computer program, when executed by the processor, causes the processor to perform the following operation:

wherein obtaining backward-derived hidden states through backward derivation comprises: obtaining, by using a back propagation algorithm, each of the backward-derived hidden states of the previous time moment through backward derivation from each of the hidden state in the time sequence of the hidden states outputted by the preliminarily-trained decoding network.

17. The computer device according to claim 13, wherein the computer program, when executed by the processor, causes the processor to perform the following operations:
  inputting the labeled training sample into the encoding network, and extracting a feature of the training sample, to obtain an eigenvector of the training sample;
  inputting the eigenvector into the decoding network to obtain the time sequence of hidden states for the training sample;
  for each time moment in the time sequence of hidden states, generating a word according to corresponding hidden state in the sequence of hidden states;
  obtaining a value of the first loss function according to the generated word and an actual label word corresponding to each time moment; and
  obtaining preliminary model parameters of the abstract description generation model by minimizing the first loss function to below a predetermined threshold value.

* * * * *